United States Patent
Dean et al.

(10) Patent No.: US 6,893,033 B2
(45) Date of Patent: May 17, 2005

(54) INTEGRATED AIR SPRING AND STRUT

(75) Inventors: Simon Dean, Waterford, MI (US); Robert P. Carlstedt, Rochester Hills, MI (US)

(73) Assignee: Arvin Technologies, Inc., Troy, MI (US)

( * ) Notice: Subject to any disclaimer, the term of this patent is extended or adjusted under 35 U.S.C. 154(b) by 94 days.

(21) Appl. No.: 10/243,786

(22) Filed: Sep. 13, 2002

(65) Prior Publication Data

US 2004/0051271 A1 Mar. 18, 2004

(51) Int. Cl.$^7$ .......................... B60G 11/27; B60G 11/28; B60G 11/30
(52) U.S. Cl. .......................... 280/124.158; 280/93.512; 267/64.15; 188/269
(58) Field of Search .......................... 267/64.15–64.26; 188/269, 322.19; 280/124.158–124.161, 93.512; B60G 11/27, 11/28, 11/30

(56) References Cited

U.S. PATENT DOCUMENTS

| | | | | |
|---|---|---|---|---|
| 3,232,599 A | * | 2/1966 | Faisandier | 267/64.16 |
| 3,246,905 A | * | 4/1966 | Morgan | 280/6.159 |
| 3,332,677 A | * | 7/1967 | Long, Jr. | 267/34 |
| 4,877,223 A | * | 10/1989 | Hackett | 267/64.17 |

FOREIGN PATENT DOCUMENTS

DE 195 03 454 A1 * 8/1996

* cited by examiner

Primary Examiner—Ruth Ilan
(74) Attorney, Agent, or Firm—Carlson, Gaskey & Olds, P.C.

(57) ABSTRACT

A strut for a vehicle suspension includes a hydraulic cylinder housing defining a hydraulic fluid chamber. The hydraulic cylinder includes an air passage adjacent to the chamber and separated therefrom by a first common wall. An air spring is supported on an upper portion of the cylinder housing in fluid communication with the air passage. An air reservoir extends from a portion of the cylinder housing and is in fluid communication with and fluidly connected to the air spring by the air passage. The air reservoir and the chamber are separated by a second common wall. The air reservoir preferably forms at least a portion of the knuckle, which supports the wheel end. In this manner, the knuckle and hydraulic cylinder are preferably integrated into one structure, preferably by a single cast unit. The integrated air reservoir and air passage reduces the size of the air spring and eliminates the need for a remote air chamber and associated hoses and fittings.

8 Claims, 1 Drawing Sheet

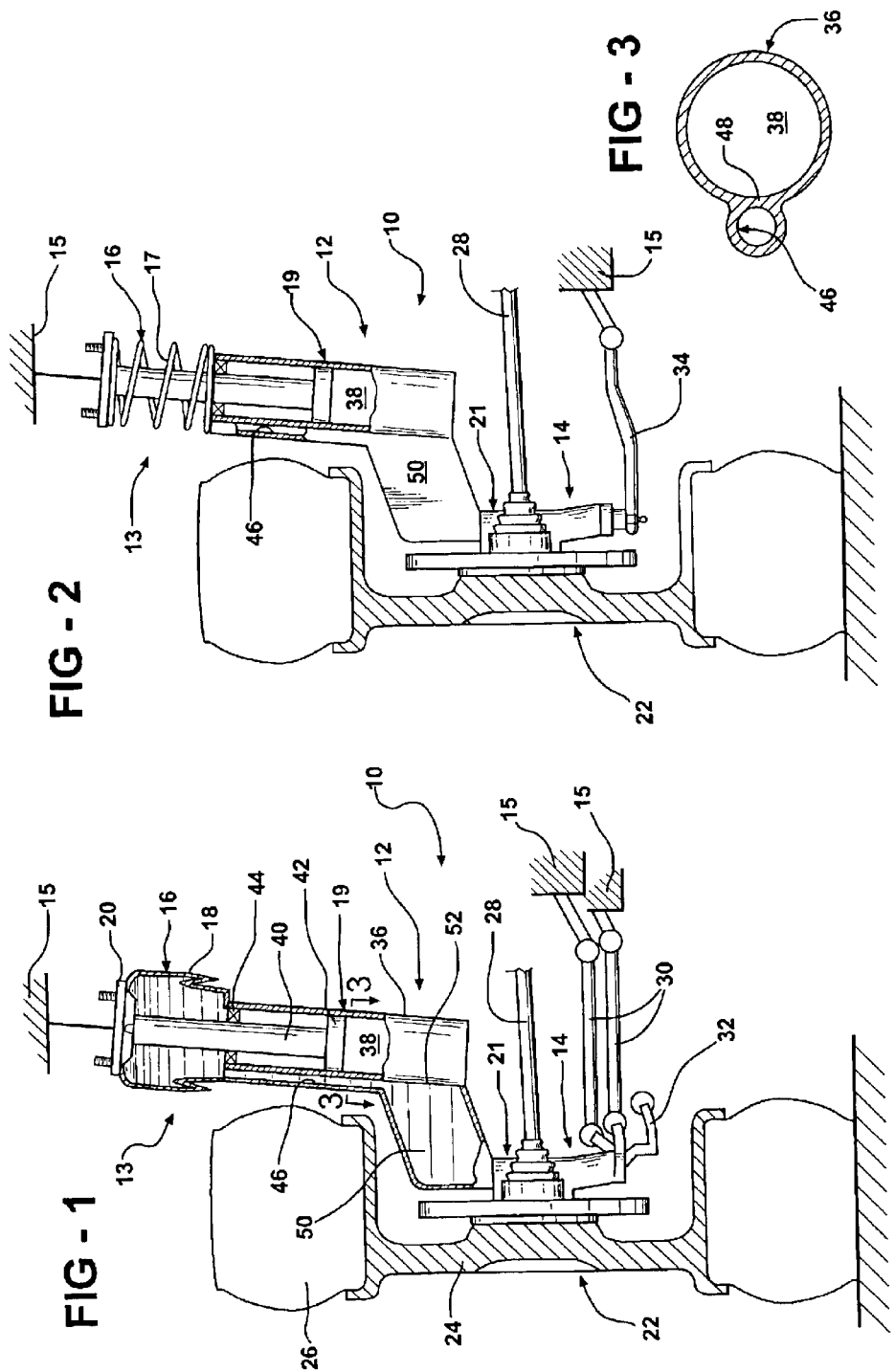

INTEGRATED AIR SPRING AND STRUT

BACKGROUND OF THE INVENTION

This invention relates to a strut for a vehicle suspension system, and more particularly, the invention relates to an integrated strut and knuckle incorporating an air reservoir for use with an air spring.

Various types of vehicle suspensions are employed in modern vehicles. One type of common suspension is a McPherson strut suspension. The strut typically includes a hydraulic damper with a knuckle secured to the damper by fasteners. A spring, typically a coil spring, is secured to the upper portion of the strut between the strut and the vehicle frame. A wheel end is supported on the knuckle, and the strut turns in response to a steering input on the knuckle to turn the vehicle. The wheel end may receive rotational drive through an aperture in the knuckle.

For some vehicle applications, it is desirable to incorporate an air spring into the suspension for improved ride, handling, and load leveling capabilities. Air springs are difficult to package in passenger vehicles due to the large air volume needed to produce an effective spring rate. Incorporating an air spring in a McPherson strut assembly posses further space constraints. If sufficient space for the air bag is not available at the vehicle's spring location, then remote air chambers must be used to reach the required spring rate. In this case, remote air chambers are connected to the main air spring by air hoses and fittings, that add to the cost and potential air leaks. Therefore, what is needed is a McPherson strut that may effectively utilize an air spring.

SUMMARY OF THE INVENTION AND ADVANTAGES

The present invention provides a strut for a vehicle suspension including a hydraulic cylinder housing defining a hydraulic fluid chamber. The hydraulic cylinder includes an integrated air passage adjacent to the chamber and separated therefrom by a first common wall. An integrated air spring is supported on an upper portion of the cylinder housing in fluid communication with the air passage. An air reservoir extends from a portion of the cylinder housing and is in fluid communication with and fluidly connected to the air spring by the air passage. The air reservoir and the chamber are separated by a second common wall. The air reservoir preferably forms at least a portion of the knuckle, which supports the wheel end. In this manner, the knuckle and hydraulic cylinder are preferably integrated into one structure, preferably by a single cast unit. The integrated air reservoir and air passage reduces the size of the air spring and eliminates the need for a remote air chamber and associated hoses and fittings.

Accordingly, the above invention provides a McPherson strut that may effectively utilize an air spring.

BRIEF DESCRIPTION OF THE DRAWINGS

Other advantages of the present invention can be understood by reference to the following detailed description when considered in connection with the accompanying drawings wherein:

FIG. 1 is a cross-sectional view of the present invention strut incorporating an air spring;

FIG. 2 is a cross-sectional view of the present invention strut used with a conventional mechanical coil spring; and FIG. 3 is a cross-sectional view of the strut shown in FIG. 1 taken along lines 3—3.

DETAILED DESCRIPTION OF THE PREFERRED EMBODIMENT

A vehicle suspension 10 utilizing a McPherson strut configuration is shown in FIGS. 1 and 2. The strut 12 includes upper 13 and lower 14 portions. The upper portion 13 supports a spring 16 such as the air spring 18 shown in FIG. 1. The upper portion 13 is supported on the vehicle frame 15 by any suitable known manner. More specifically, the upper portion 13 is connected at the frame 15 by an upper mount 20. The spring 16 is typically retained between the upper mount 20 and the hydraulic damper 19. The strut 12 includes a hydraulic damper 19 with a knuckle 21 at the lower portion 14. The knuckle 21 supports a wheel end 22, as is well known in the art. The wheel end 22 includes a wheel 24 supporting a tire 26. The wheel 24 receives drive from a drive axle 28 connected to a transmission. The strut 12 may rotate in response to a steering input, as is known in the art.

The vehicle suspension 10 shown in FIG. 1 includes a pair of lateral links 30 and a longitudinal link 32 supporting the lower portion of the knuckle 21. The vehicle suspension 10 depicted in FIG. 2 illustrates a conventional McPherson strut arrangement in which a lower control arm 34 supports a lower portion of the knuckle 21. A mechanical coil spring 17 typically used in McPherson strut configurations is shown supported by the upper portion 13 of the strut 12.

Returning to FIG. 1, the strut 12 includes a hydraulic cylinder housing 36 defining a hydraulic fluid chamber 38. A piston 42 connected to a rod 40 moves axially in the hydraulic fluid chamber 38, as is known in the art, to dampen inputs received from the wheel end from the roadway. The rod 40 is supported by a cylinder head 44 supported by an upper portion of the hydraulic cylinder housing 36.

The hydraulic cylinder housing 36 and knuckle 21 are preferably integrally formed by a single casting. An air passage 46 is cast alongside the hydraulic cylinder housing 36 and shares a first common wall 48, best shown in FIG. 3, that separates the air passage 46 from the hydraulic cylinder housing 36. The air passage 46 is in fluid communication with the air spring 18, as shown in FIG. 1. An air reservoir 50 is formed by at least a portion of the knuckle 21, which shares a second common wall 52 with the hydraulic cylinder housing 36 similar to the common wall between the air passage 46 and hydraulic cylinder housing 36. The air reservoir 50 is in fluid communication with the air spring 18 through the air passage 46.

The knuckle and hydraulic cylinder housing are preferably formed from a single casting. A first passageway is cast forming a longitudinal hydraulic chamber. A second passageway is cast with a portion adjacent to the first passageway with the portion sharing a common wall with the first passageway. The second passageway forms the air passage 46. The air reservoir 50 protrudes from an end of the first passageway, or hydraulic chamber housing, in fluid communication with the second passageway. At least a portion of the knuckle 21 is formed by the air reservoir 50.

While the present invention strut is best suited for a suspension utilizing an air spring, the strut may also be used with a conventional coil spring 17 as shown in FIG. 2 to reduce the number of components for a particular vehicle or across vehicle lines when an air spring suspension system is not desired.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A strut for a vehicle suspension system comprising:
   a hydraulic cylinder housing defining a hydraulic fluid chamber, said hydraulic cylinder housing having an air passage adjacent to said hydraulic fluid chamber and separated therefrom by a first common wall portion;
   an air spring supported on an upper portion of said hydraulic cylinder housing in fluid communication with said air passage; and
   an air reservoir extending from a portion of said hydraulic cylinder housing and in fluid communication with and fluidly connected to said air spring by said air passage, said air reservoir and said hydraulic fluid chamber separated by a second common wall portion, said first and second wall portions extending generally in the same direction.

2. The strut according to claim 1, wherein said air reservoir defines at least a portion of a knuckle supporting a wheel end.

3. The strut according to claim 1, wherein said air passage and said hydraulic fluid chamber extend longitudinally in generally the same direction.

4. The strut according to claim 1, wherein said hydraulic fluid chamber extends longitudinally and said air reservoir protrudes transversely away from said hydraulic fluid chamber.

5. The strut according to claim 1, wherein said air reservoir is arranged at an end opposite said air spring.

6. A strut for a vehicle suspension system comprising:
   a hydraulic cylinder housing defining a hydraulic fluid chamber, said hydraulic cylinder housing having an air passage adjacent to said hydraulic fluid chamber and separated therefrom by a first common wall portion;
   an air spring supported on an upper portion of said hydraulic cylinder housing in fluid communication with said air passage; and
   an air reservoir extending from a portion of said hydraulic cylinder housing and in fluid communication with and fluidly connected to said air spring by said air passage, said air reservoir and said hydraulic cylinder chamber separated by a second common wall portion, and said air reservoir forming at least a portion of a knuckle.

7. The strut according to claim 6, wherein said portion of said knuckle is disposed within a wheel.

8. The strut according to claim 6, wherein a suspension support structure is connected to another portion of said knuckle opposite said air reservoir with said support structure for connection to a vehicle frame.

* * * * *